(12) United States Patent
Narukawa et al.

(10) Patent No.: US 9,528,053 B2
(45) Date of Patent: Dec. 27, 2016

(54) CIRCULATING FLUIDIZED BED-TYPE GASIFICATION FURNACE AND FLUID MEDIUM FLOW RATE CONTROL METHOD

(75) Inventors: Masahiro Narukawa, Tokyo (JP); Makoto Takafuji, Tokyo (JP); Toshiyuki Suda, Tokyo (JP)

(73) Assignee: IHI CORPORATION (JP)

( * ) Notice: Subject to any disclaimer, the term of this patent is extended or adjusted under 35 U.S.C. 154(b) by 234 days.

(21) Appl. No.: 14/123,662

(22) PCT Filed: Jun. 18, 2012

(86) PCT No.: PCT/JP2012/065486
§ 371 (c)(1),
(2), (4) Date: Dec. 3, 2013

(87) PCT Pub. No.: WO2012/176726
PCT Pub. Date: Dec. 27, 2012

(65) Prior Publication Data
US 2014/0091260 A1  Apr. 3, 2014

(30) Foreign Application Priority Data
Jun. 22, 2011 (JP) .................... 2011-138496

(51) Int. Cl.
*B01J 7/00* (2006.01)
*C10J 3/72* (2006.01)
(Continued)

(52) U.S. Cl.
CPC ................ *C10J 3/723* (2013.01); *C10J 3/482* (2013.01); *F23C 10/005* (2013.01); *F23C 10/04* (2013.01);
(Continued)

(58) Field of Classification Search
CPC ................ C10J 2300/1807; C10J 3/482; C10J 2300/0993; C10J 3/12; F23C 10/32; F23C 10/04; F23C 10/30
See application file for complete search history.

(56) References Cited

U.S. PATENT DOCUMENTS 4,412,848 A * 11/1983 Koyama .................... C10J 3/58
                                                 48/197 R
4,461,629 A *  7/1984 Arisaki .................. B01D 46/38
                                                 122/7 R
(Continued)

FOREIGN PATENT DOCUMENTS

CN       1318796 C     5/2007
JP      53-027135     3/1978
(Continued)

OTHER PUBLICATIONS

International Search Report and Written Opinion mailed Aug. 21, 2012 in corresponding PCT International Application No. PCT/JP2012/065486.
(Continued)

*Primary Examiner* — Imran Akram
(74) *Attorney, Agent, or Firm* — Ostrolenk Faber LLP

(57) ABSTRACT

A gasification furnace (110) of a circulation fluidized bed-type gasification furnace (100) forms a fluid medium into a fluid bed, and produces gasified gas by gasifying an input gasification raw material using heat from the fluid medium. A combustion furnace (102) heats the fluid medium output from the gasification furnace. A flow rate adjuster (106) distributes the fluid medium heated in the combustion furnace to the gasification furnace and a buffer section (112). In this manner, irrespective of the flow rate of the fluid medium in the entire circulation fluidized bed-type gasification furnace (100), the buffer section (112) enables the fluid medium to bypass to the combustion furnace. As a result, the flow
(Continued)

rate of the fluid medium in the gasification furnace (110) can be maintained at a desired flow rate.

7 Claims, 3 Drawing Sheets

(51) Int. Cl.
    *F23C 10/00*     (2006.01)
    *F23C 10/10*     (2006.01)
    *F23C 10/32*     (2006.01)
    *C10J 3/48*     (2006.01)
    *F23C 10/04*     (2006.01)
    *F23C 10/30*     (2006.01)

(52) U.S. Cl.
    CPC ............... *F23C 10/10* (2013.01); *F23C 10/30* (2013.01); *F23C 10/32* (2013.01); *C10J 2300/0976* (2013.01); *C10J 2300/0993* (2013.01); *C10J 2300/1246* (2013.01); *C10J 2300/1606* (2013.01); *C10J 2300/1807* (2013.01); *C10J 2300/1853* (2013.01); *F23C 2206/102* (2013.01); *Y02E 20/18* (2013.01)

(56) References Cited

U.S. PATENT DOCUMENTS

| | | | | |
|---|---|---|---|---|
| 4,969,930 | A | * | 11/1990 | Arpalahti ................... C10J 3/54 110/347 |
| 5,154,732 | A | * | 10/1992 | Hakulin ..................... C10J 3/54 110/245 |
| 7,503,945 | B2 | * | 3/2009 | Hiltunen .................. C10J 3/482 422/139 |
| 2007/0261948 | A1 | * | 11/2007 | Jacobsen ..................... C10J 3/04 201/15 |
| 2010/0024297 | A1 | | 2/2010 | Suda et al. ......................... 48/61 |
| 2010/0050516 | A1 | * | 3/2010 | Murakami ............... C10J 3/482 48/113 |
| 2010/0263487 | A1 | * | 10/2010 | Orth ........................ C10B 49/10 75/477 |
| 2011/0073021 | A1 | * | 3/2011 | Takafuji et al. .............. 110/218 |
| 2011/0120007 | A1 | * | 5/2011 | Matsuzawa .............. C10J 3/463 48/61 |

FOREIGN PATENT DOCUMENTS

| | | |
|---|---|---|
| JP | 57-038930 | 3/1982 |
| JP | 58-018001 | 2/1983 |
| JP | 07-011270 | 1/1995 |
| JP | 09-079539 | 3/1997 |
| JP | 10-19206 A | 1/1998 |
| JP | 2002-235917 | 8/2002 |
| JP | 2003-207114 | 7/2003 |
| JP | 2004-132621 | 4/2004 |
| JP | 2005-274015 | 10/2005 |
| JP | 2008-156552 | 7/2008 |
| JP | 2009-040887 | 2/2009 |
| JP | 2011-084608 | 4/2011 |
| WO | WO 2008/107929 A1 | 9/2008 |

OTHER PUBLICATIONS

Chinese Office Action, dated Mar. 16, 2015, issued in corresponding Chinese Patent Application No. 201280029940.2. English translation. Total 16 pages.

* cited by examiner

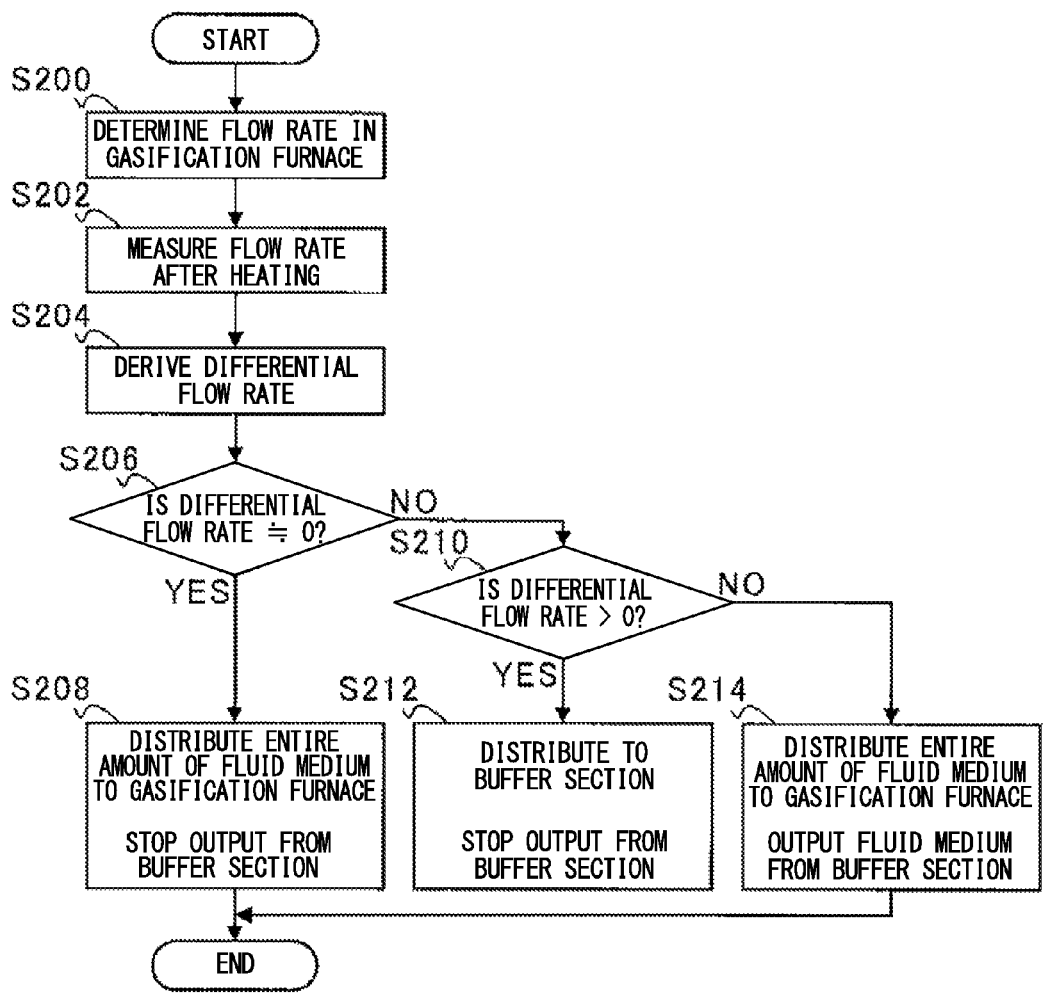

US 9,528,053 B2

CIRCULATING FLUIDIZED BED-TYPE GASIFICATION FURNACE AND FLUID MEDIUM FLOW RATE CONTROL METHOD

CROSS-REFERENCE TO RELATED APPLICATIONS

The present application is a 35 U.S.C. §§371 national phase conversion of PCT/JP2012/065486, filed Jun. 18, 2012, which claims priority to Japanese Patent Application No. 2011-138496, filed Jun. 22, 2011, the contents of which are incorporated herein by reference. The PCT International Application was published in the Japanese language.

FIELD OF THE INVENTION

The present invention relates to a circulating fluidized bed-type of gasification furnace that gasifies a gasification raw material by circulating a fluid medium, and to a fluid medium flow rate control method for a circulating fluidized bed-type of gasification furnace.

BACKGROUND ART

In recent years, technology has been developed that gasifies organic solid material such as coal, biomass, and tire chips instead of oil in order to produce gasified gas. The gasified gas that is produced in this manner is used in efficient power generation systems known as Integrated coal Gasification Combined Cycle (IGCC) systems, and in the manufacturing of hydrogen, the manufacturing of synthetic fuel (i.e., synthetic oil), and in the manufacturing of chemical products such as chemical fertilizers (i.e., urea) and the like. Of the organic solid materials that form the raw materials for gasified gas, the ratio of reserves to production for coal, in particular, is approximately 150 years, which is approximately three or more times the ratio of reserves to production of oil. Moreover, because coal deposits are not unevenly distributed compared to oil, they are expected to be a natural resource that is capable of providing a stable supply for an extended period of time.

Conventionally, the process of gasifying coal is achieved by performing partial oxidation using oxygen and air, however, because an extremely high temperature of approximately 1800° C. and an extremely high pressure of approximately 3 MPa are required, special materials that are able to withstand high temperatures and high pressures are required so that the conventional technology has the drawback that the costs of the gasification furnace are extremely expensive. In order to solve this problem, technology has been developed that utilizes steam in order to gasify coal at lower temperatures of between approximately 700° C. to 900° C., and at normal pressure. This technology has the advantages that, by setting the temperature and pressure at lower levels, special structure to withstand high pressure is not required, and commercially available items already in common use can be employed.

However, in the above-described organic solid material steam gasification reaction, a comparatively long reaction time is required. Because of this, the gasification furnace main unit is designed having a size that ensures adequate residence time for the organic solid material to react sufficiently. In a gasification process of this type, it is necessary during actual use to adjust the gasification efficiency (i.e., the carbon conversion ratio). However, it is not realistic to change the residence time of the organic solid material by changing the volume of the gasification furnace main unit.

Accordingly, as one method of indiscriminately adjusting the carbon conversion ratio in the gasification, a method in which the residence time of the organic solid material is changed by adjusting the amount of circulation of a fluid medium inside the gasification furnace main unit may be considered.

For example, it is possible to adjust the amount of circulation of a fluid medium very simply by adding the fluid medium to or extracting it from a gasification furnace. Moreover, technology has also been disclosed (see, for example, Patent document 1) in which a flow rate control unit adjusts the output quantity of the fluid medium that is output from the gasification furnace main unit in a circulating fluidized bed boiler apparatus. Furthermore, technology is also known (see, for example, Patent document 2) in which, by controlling the pressure inside a chamber that contains a fluidized bed in a circulating fluidized bed furnace, the bed height of the fluidized bed is adjusted, so that the amount of circulation of the fluid medium is controlled.

RELATED ART DOCUMENTS

Patent Documents

[Patent document 1] Japanese Patent Application, First Publication No. 2005-274015
[Patent document 2] International Patent Application, Publication No. WO2008/107929

DISCLOSURE OF THE INVENTION

Problems to be Solved by the Invention

However, in the technology described in Patent document 1, because the flow path of the fluid medium becomes extremely narrow in the portion where the fluid medium is output from the flow rate control unit, there is a possibility that the fluid medium that accompanies the steam will become blocked. Moreover, in Patent document 2, the structure required is immense and not only are the manufacturing costs and operating costs enormous, but, in spite of the high costs, there is not much scope for increasing the range of adjustment of the amount of circulation of the fluid medium.

Therefore, the present invention was conceived in view of the above-described circumstances and it is an object thereof to provide a circulating fluidized bed-type gasification furnace and a fluid medium flow rate control method that make it possible to achieve highly accurate flow rate control by means of a simple structure, while guaranteeing the safety of the gasification furnace main unit.

Means for Solving the Problem

In order to solve the above-described problems, a circulating fluidized bed-type gasification furnace according to the present invention is provided with: a gasification furnace that forms a fluid medium into a fluid bed, and produces gasified gas by gasifying an input gasification raw material using heat from the fluid medium; a combustion furnace that heats the fluid medium output from the gasification furnace; a buffer section that stores the fluid medium and outputs it to the combustion furnace; and a flow rate adjuster that distributes the fluid medium heated in the combustion furnace to the gasification furnace and the buffer section.

It is also possible for an extraction hole that is used to extract fluid medium that is stored therein to the outside to be provided in the buffer section. Moreover, it is also possible for an introduction hole that is used to introduce fluid medium from the outside to be provided in the buffer section.

It is also possible for a sealed portion that prevents a reverse flow of gas from the buffer section to the flow rate adjuster to be provided in at least a connecting portion between the buffer section and the flow rate adjuster.

Moreover, the present invention also relates to a method of controlling the flow rate of a fluid medium in a circulation fluidized bed-type gasification furnace that is provided with: a gasification furnace that forms a fluid medium into a fluid bed, and produces gasified gas by gasifying an input gasification raw material using heat from the fluid medium; a combustion furnace that heats the fluid medium output from the gasification furnace; a buffer section that stores the fluid medium and outputs it to the combustion furnace; a flow rate measurement section that measures the flow rate of the heated fluid medium; and a flow rate adjuster that distributes the fluid medium heated in the combustion furnace to the gasification furnace and the buffer section. In order to solve the above-described problems, in the fluid medium flow rate control method of the present invention, the flow rate of the fluid medium in the gasification furnace is determined in accordance with a target production quantity of gasified gas, the flow rate of the fluid medium heated in the combustion furnace is measured, a differential flow rate is derived by subtracting the determined flow rate of the fluid medium in the gasification furnace from the flow rate of the heated fluid medium, and if the differential flow rate is a positive value, the differential flow rate amount of fluid medium is distributed from the flow rate adjuster to the buffer section, and if the differential flow rate is a negative value, the differential flow rate amount of fluid medium is output to the gasification furnace.

Effects of the Invention

According to the present invention, it is possible to achieve highly accurate flow rate control for a fluid medium by means of a simple structure, while guaranteeing the safety of the gasification furnace main unit.

BRIEF DESCRIPTION OF THE DRAWINGS

FIG. 3 is a flowchart illustrating the processing flow of a fluid medium flow rate control method.

EMBODIMENTS FOR CARRYING OUT THE INVENTION

Preferred embodiments of the present invention will now be described in detail with reference made to the attached drawings. The dimensions, materials and other specific numerical values and the like portrayed in the present embodiment are merely examples that are intended to make the invention easier to understand and are not to be considered as limiting of the present invention unless it is specifically stated otherwise. Note that in the present specification and drawings, elements having essentially the same functions and structure are allocated the same descriptive symbols so that any duplicated description thereof is omitted. Moreover, any elements not directly related to the present invention have been omitted from the drawings.

(Circulating Fluidized Bed-Type Gasification Furnace 100)

Figure 1:
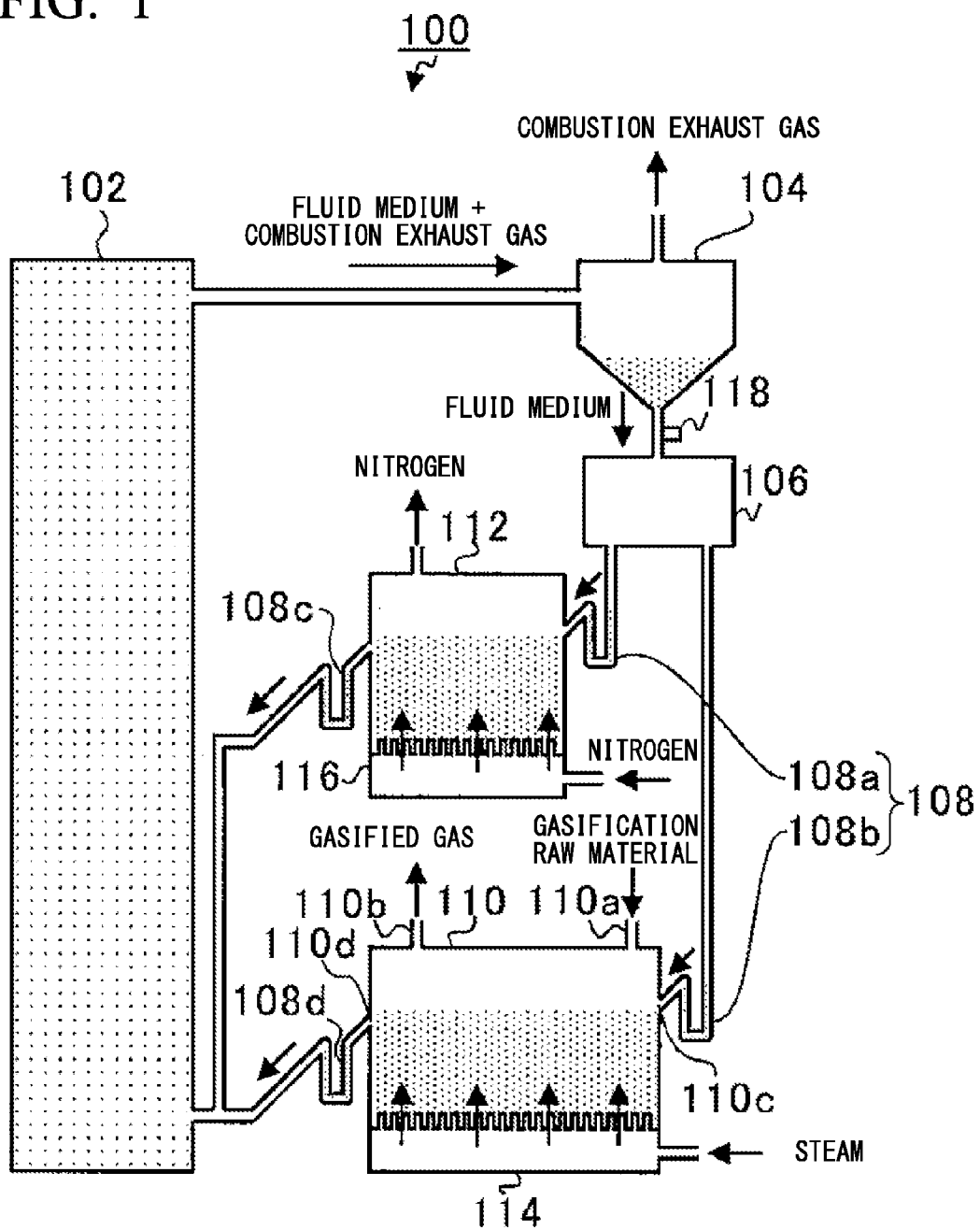
FIG. 1 is a view illustrating the specific structure of a circulating fluidized bed-type gasification furnace.

FIG. 1 is a view illustrating the specific structure of a circulating fluidized bed-type gasification furnace 100.

Here, a description is given using a circulation fluidized bed-type of gasification furnace 100 that fluidizes sand in a horizontal direction as an example, however, a circulation fluidized bed-type of gasification furnace in which sand flows in a vertically downward direction under its own weight so as to form a moving bed can also be used.

In the circulating fluidized bed-type of gasification furnace 100, a fluid medium that is formed in general by sand such as burrstone sand (i.e., silica sand) having a grain diameter of approximately 300 μm is circulated as the thermal catalyst. Specifically, firstly, the fluid medium is heated in a combustion furnace 102 to approximately 1000° C., and is then introduced together with the combustion exhaust gas to a medium separator 104. In the medium separator 104, the high-temperature fluid medium and the combustion exhaust gas are separated from each other, and the separated high-temperature fluid medium is output to a gasification furnace 110 and a buffer section 112 via a flow rate adjuster 106 and a sealed portion 108 (108a and 108b). On the other hand, the combustion exhaust gas that was separated out in the medium separator 104 is thermally recovered by means of a boiler or the like (not shown). The fluid medium introduced into the gasification furnace 110 is fluidized using a gasification agent (here, steam is used) that is introduced from a steam storage section 114, and is then returned to the combustion furnace 102. Moreover, the fluid medium introduced into the buffer section 112 is fluidized using a fluidizing gas (here, nitrogen is used) that is introduced from a nitrogen storage section 116 and, in the same way as in the gasification furnace 110, is then returned to the combustion furnace 102. Hereinafter, each of the apparatuses that make up the circulation fluidized bed-type of gasification furnace 100 will be described in detail.

(Gasification Furnace 110)

The steam storage section 114 is provided underneath the gasification furnace 110, and the steam that is supplied from a steam supply source (not shown) is temporarily stored in the steam storage section 114. The steam stored in the steam storage section 114 is introduced into the interior of the gasification furnace 110 through a base surface of the gasification furnace 110. In this manner, by introducing steam into the high-temperature fluid medium that was introduced from the flow rate adjuster 106, a fluid bed is formed inside the gasification furnace 110.

A gasification raw material loading section 110a that is used to load gasification raw material that includes an organic solid material such as a coal such as lignite, or petroleum coke (i.e., vetrocoke), biomass, or tire chips or the like into the above-described fluid bed is provided in the gasification furnace 110. The gasification raw material loaded from the gasification raw material loading section 110a is gasified by the approximately 700° C. to 900° C. heat provided by the fluid medium that has been formed into a fluid bed by the steam and, as a result, gasified gas is produced. If the gasification raw material happens to be coal, then gasified gas whose principal components are hydrogen, carbon monoxide, carbon dioxide, and methane is produced.

After the gasified gas that is produced in this manner has been output from a gasified gas output portion 110b that is provided in the gasification furnace 110, it is recovered by a recovery apparatus (not shown). The gasification furnace 110 also communicates with the combustion furnace 102 via a sealed portion 108d. This sealed portion 108d is connected to a side wall opposite the side wall to which the flow rate adjuster 106 is connected. Accordingly, the fluid medium introduced from the flow rate adjuster 106 flows towards the sealed portion 108d inside the gasification furnace 110, and thereafter is output to the combustion furnace 102 via the sealed portion 108d.

In the present embodiment, because a gasification raw material is gasified using steam, the gasification efficiency (i.e., the carbon conversion ratio) is determined by the residence time of the gasification raw material inside the gasification furnace 110. Accordingly, adjusting the flow rate of the fluid medium in the gasification furnace 110 is effective towards adjusting the gasification efficiency. For example, if the flow rate of the fluid medium is increased, then the flow speed of the fluid bed increases so that the gasification efficiency deteriorates. In contrast, if the flow rate of the fluid medium is decreased, then the flow speed of the fluid bed decreases so that the gasification efficiency is improved. Note that the bed height is maintained by adjusting the amount of steam in accordance with the flow rate.

However, adjusting the flow rate by means of the aperture ratio of the flow path in an entry port 110c of the gasification furnace 110 or in an exit port 110d of the gasification furnace 110 is not practical as there is a possibility that this will lead to blockages of the fluid medium, or to problems with the capability of movable portions to withstand high temperatures. In the present embodiment, by providing the flow rate adjuster 106 and the buffer section 112 so that the fluid medium circulating through the circulating fluidized bed-type gasification furnace 100 is bypassed to the gasification furnace 110, the flow rate (i.e., the inventory rate) of the fluid medium in the gasification furnace 110 can be adjusted.

(Flow Rate Adjuster 106)

The flow rate adjuster 106 distributes the fluid medium that has been heated by the combustion furnace 102 and then separated by the medium separator 104 to the gasification furnace 110 and the buffer section 112 (for example, 80% to the gasification furnace 110 and 20% to the buffer section), and then outputs the fluid medium to each of these. Note that it is also possible for the fluid medium to be distributed to only one of these. Specifically, the flow adjuster 106 determines the flow rate of the fluid medium in the gasification furnace 110 in accordance with the target production quantity of gasified gas, and the flow rate of the fluid medium separated in the medium separator 104 is measured by a flow rate measurement section 118 or is measured based on the pressure distribution in the combustion furnace 102. A differential flow rate is then derived by subtracting the determined flow rate of the fluid medium in the gasification furnace 110 from the flow rate of the fluid medium that was separated in the medium separator 104.

If this differential flow rate is a positive value, namely, if the flow rate of the fluid medium that was separated in the medium separator 104 is greater than the desired flow rate of the fluid medium in the gasification furnace 110, the flow rate adjuster 106 distributes the differential flow rate amount of fluid medium from the flow rate adjuster 106 to the buffer section 112 (i.e., it outputs the differential flow rate amount to the buffer section 112 and outputs the remainder to the gasification furnace 110), and maintains a state in which the output of fluid medium from the buffer section 112 to the combustion furnace 102 is stopped.

If, however, the differential flow rate is a negative value, namely, if the flow rate of the fluid medium that was separated in the medium separator 104 is less than the desired flow rate of the fluid medium in the gasification furnace 110, the flow rate adjuster 106 outputs the entire amount of fluid medium that was separated in the medium separator 104 to the gasification furnace 110 (i.e., it stops the distribution of the fluid medium to the buffer section 112), and outputs the differential flow rate amount of fluid medium from the buffer section 112 to the sealed portion 108c via the combustion furnace 102.

Moreover, if the differential flow rate is zero or within a range of tolerance that can be regarded as zero, the flow rate adjuster 106 outputs the entire amount of fluid medium that was separated in the medium separator 104 to the gasification furnace 110, and maintains a state in which the output of the fluid medium from the buffer section 112 to the combustion furnace 102 is stopped.

This distribution of the fluid medium to the buffer section 112 and the output of the fluid medium from the buffer section 112 may be performed exclusively of each other, or may be performed in parallel with each other.

At this time, the flow rate (i.e., in the combustion furnace 102 and the medium separator 104) as well as the total quantity of the fluid medium in the entire circulating fluidized bed-type gasification furnace 100 do not change, however, in the gasification furnace 110, although the actual overall quantity of fluid medium is maintained, the flow rate of the introduced fluid medium does change. This type of structure is possible because the amount of change in the flow rate in the gasification furnace 110 is secured by the buffer section 112. In other words, the flow rate of the fluid medium in the entire circulating fluidized bed-type gasification furnace 100 is apportioned between the gasification furnace 110 and the buffer section 112.

(Buffer Section 112)

Figure 2:
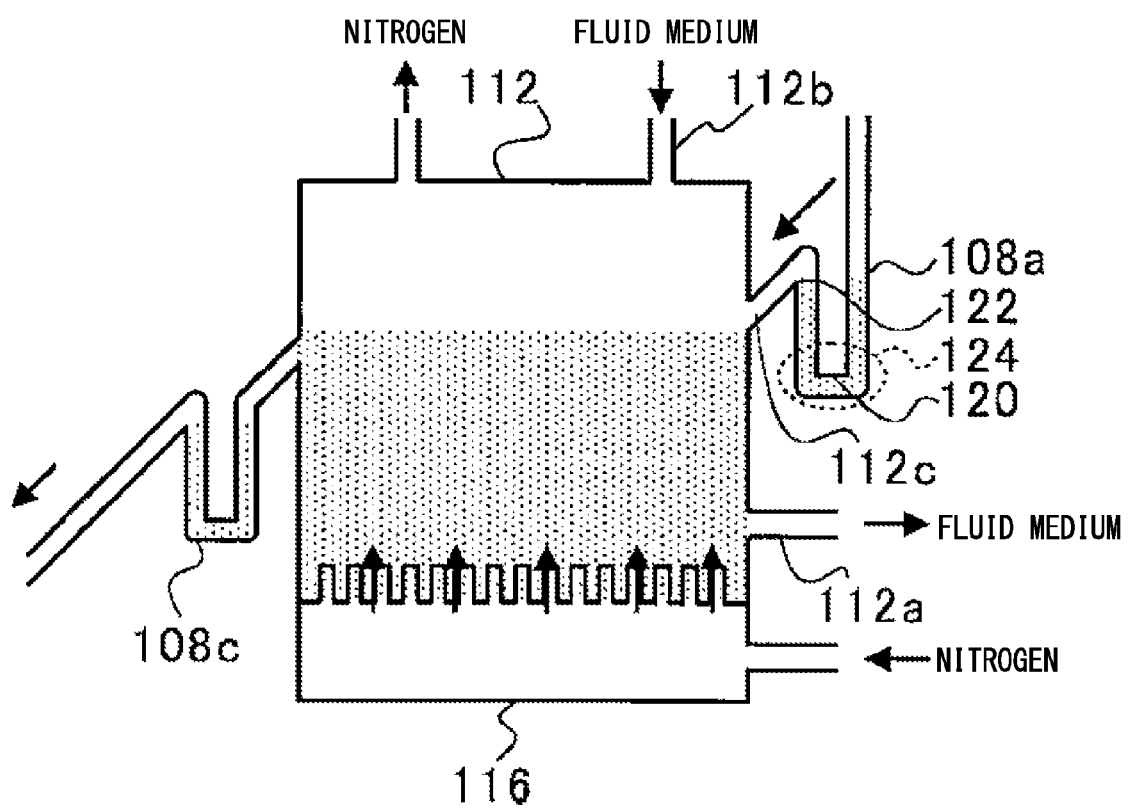
FIG. 2 is a view showing the structure of a buffer section.

FIG. 2 shows the structure of the buffer section 112. The nitrogen storage section 116 is provided underneath the buffer section 112, and nitrogen that is supplied from a nitrogen supply source (not shown) is temporarily stored in the nitrogen storage section 116. The nitrogen stored in this nitrogen storage section 116 is introduced into the buffer section 112 via the base surface of the buffer section 112. In the present embodiment, nitrogen is used as the fluidizing gas that fluidizes the fluid medium, however, it is also possible to use air, oxygen, steam, and carbon dioxide and the like. In this way, by introducing nitrogen into the high-temperature fluid medium that has been introduced from the flow rate adjuster 106, a fluidized bed is also formed inside the buffer section 112 as well, in the same way as in the gasification furnace 110. The buffer section 112 temporarily stores the fluid medium that has been distributed thereto by the flow rate adjuster 106, and also outputs the stored fluid medium to the combustion furnace 102 in accordance with control commands from the flow rate adjuster 106.

By employing this type of structure, if the differential flow rate is a positive value, then this differential flow rate can be absorbed by the buffer section 112, while if the differential flow rate is a negative value, then the stored fluid medium can be added to the systems of the combustion furnace 102 and the medium separator 104.

Moreover, an extraction hole 112a that is used to extract stored fluid medium to the outside is provided in the buffer section 112. Because residual substances such as ash and the like from gasification raw material that was not reacted in the gasification furnace 110 or the combustion furnace 102 are contained in the fluid medium, it is necessary for an operation to extract the fluid medium to be performed periodically. In the present embodiment, because fluid medium containing this type of residue is not extracted directly from the gasification furnace 110 where gasified gas is produced, but is extracted indirectly from the buffer section 112 whose purpose is to adjust the flow rate of the fluid medium, it is possible to decrease the burden on the gasification furnace 110 and the combustion furnace 102. Moreover, because there are no effects on the gasification processes, the fluid medium can be extracted while the gasified gas is being produced.

If the fluid medium is being extracted during maintenance or the like, then it is necessary for new fluid medium to be introduced. In the present embodiment, the buffer section 112 is provided with an introduction hole 112b through which new fluid medium is introduced from the outside. Accordingly, by introducing fluid medium indirectly into the buffer section 112 whose purpose is to adjust the flow rate of the fluid medium instead of directly into the gasification furnace 110 or the combustion furnace 102, in the same way as with the effect obtained from the extraction hole 112, it is possible to reduce the burden on the gasification furnace 110 and the combustion furnace 102.

By using this type of flow rate adjuster 106, irrespective of the flow rate of the fluid medium in the combustion furnace 102 and medium separator 104, it is possible to adjust the flow rate of the fluid medium in the gasification furnace 110 to a desired flow rate, and it thereby becomes possible to stably produce gasified gas.

(Sealed Portion 108)

However, if the flow rate of the fluid medium in the buffer section 112 is appropriately controlled simply by using the flow rate adjuster 106, then if the fluid medium distributed to the buffer section 112 only has a low flow rate, there is a possibility that the top surface of the fluid bed will be lower than the vertical position of an intake port 112c in the buffer section 112, and that a reverse flow will be generated in the nitrogen gas or the like inside the buffer section 112. Therefore, in the present embodiment, as is shown in FIG. 2, a sealed portion 108a is provided in the pipe between the flow rate adjuster 106 and the buffer section 112.

The sealed portion 108a is formed by a J-valve pipe in which the pipe is formed in a J shape. In the sealed portion 108a, because the topmost surface in a vertical direction of a portion 120 of that flow path is lower than the bottommost surface in a vertical direction of another portion 122 of that flow path, the fluid medium always accumulates in a concave portion 124 which includes the portion 120. Accordingly, because the empty space is divided in two by the fluid medium, it is possible to prevent the gas inside the buffer section 112 reverse-flowing back to the flow adjuster 106. By employing this type of structure, it is no longer necessary for the pressure inside the buffer section 112 to be adjusted, and the positive pressure makes it possible to prevent leakages of fluidizing gas.

This type of sealed portion 108 is also provided between the flow rate adjuster 106 and the gasification furnace 110 (i.e., the sealed portion 108b), between the buffer section 112 and the combustion furnace 102 (i.e., the sealed portion 108c), and between the gasification furnace 110 and the combustion furnace 102 (i.e., the sealed section 108d). As a result, in these portions as well, in the same way as with the sealed portion 108a, it is possible to prevent the reverse flow of gases from downstream furnaces.

(Flow Rate Control Method)

Next, a flow rate control method for controlling the flow rate of a fluid medium using the above-described circulating fluidized bed-type gasification furnace 100 will be described.

FIG. 3 is a flowchart illustrating the flow of processing of a flow rate control method. Firstly, in the circulating fluidized bed-type gasification furnace 100, the flow rate of the fluid medium in the gasification furnace 110 is determined in accordance with the target production quantity of gasified gas (S200), and the flow rate measurement section 118 determines the flow rate of the fluid medium heated by the combustion furnace 102 on the downstream side of the medium separator 104 (i.e., on the flow rate adjuster 106 side) (S202).

When the determined flow rate of the fluid medium in the gasification furnace 110 is subtracted from the flow rate of the heated fluid medium, so that the differential flow rate is derived (S204), a determination is made as to whether or not that differential flow rate is zero or within a range of tolerance that can be regarded as zero (S206). If the differential flow rate is determined to be within a range of tolerance that can be regarded as zero (S206: YES), the flow rate adjuster 106 guides the entire fluid medium that was separated in the medium separator 104 to the gasification furnace 110, and maintains a state in which the output of fluid medium from the buffer section 112 to the combustion furnace 102 is stopped.

If the differential flow rate is not within a range of tolerance that can be regarded as zero (S206: NO), a determination is made as to whether or not that differential flow rate is a positive value (S210). If the differential flow rate is a positive value (S210: YES), the flow rate adjuster 106 distributes the differential flow rate amount of fluid medium from the differential adjuster 106 to the buffer section 112, and also maintains a state in which the output of fluid medium from the buffer 112 to the combustion furnace 102 is stopped (S212). If the differential flow rate is a negative value (S210: NO), the flow rate adjuster 106 guides the entire fluid medium that was separated in the medium separator 104 to the gasification furnace 110, and the buffer section 112 outputs the differential flow rate amount of fluid medium to the combustion furnace 102 (S214).

In the above-described flow rate control method as well, it is possible to achieve highly accurate flow rate control for a fluid medium by means of a simple structure, while guaranteeing the safety of the gasification furnace 110.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

For example, in each of the above-described embodiments, a structure is described in which the buffer section 112 that stores a fluid medium is provided in order to secure a change in the flow rate of the fluid medium inside the gasification furnace 110, however, the present invention is not limited to this and it is also possible, for example, to provide a pipe that connects the flow rate adjuster 106 to the combustion furnace 102, and to store the fluid medium using the length of time that the fluid medium is retained in that pipe.

INDUSTRIAL APPLICABILITY

The present invention relates to a circulating fluidized bed-type of gasification furnace that gasifies a gasification raw material by circulating a fluid medium, and to a fluid medium flow rate control method for a circulating fluidized bed-type of gasification furnace. According to the present invention, it is possible to achieve highly accurate flow rate control for a fluid medium by means of a simple structure, while guaranteeing the safety of the gasification furnace main unit.

DESCRIPTION OF THE REFERENCE NUMERALS

100 . . . Circulating fluidized bed-type gasification furnace, 102 . . . Combustion furnace, 104 . . . Medium separator, 106 . . . Flow rate adjuster, 108 . . . Sealed portion, 110 . . . Gasification furnace, 112 . . . Buffer section, 114 . . . Steam storage section, 116 . . . Nitrogen storage section, 118 . . . Flow rate measurement section

The invention claimed is:

1. A circulation fluidized bed-type gasification furnace comprising:
    a gasification furnace that is configured to form a fluid medium into a fluid bed, and is configured to produce gasified gas by gasifying an input gasification raw material using heat from the fluid medium;
    a combustion furnace that is configured to heat the fluid medium output from the gasification furnace;
    a buffer section that is configured to store the fluid medium and outputs it to the combustion furnace; and
    a flow rate adjuster that is configured to determine a flow rate of the fluid medium in the gasification furnace in accordance with a target production quantity of the gasified gas, and is configured to distribute the fluid medium heated in the combustion furnace to the gasification furnace and the buffer section based on the determined flow rate of the fluid medium in the gasification furnace,
    wherein the combustion furnace is provided at an upstream of the flow rate adjuster, and the gasification furnace and the buffer section are provided at a downstream of the flow rate adjuster, and
    wherein the gasification furnace and buffer section are not in fluid communication.

2. The circulation fluidized bed-type gasification furnace according to claim 1, wherein an extraction hole that is configured to extract fluid medium that is stored therein to the outside is provided in the buffer section.

3. The circulation fluidized bed-type gasification furnace according to claim 1, wherein an introduction hole that is configured to introduce fluid medium from the outside is provided in the buffer section.

4. The circulation fluidized bed-type gasification furnace according to claim 2, wherein an introduction hole that is configured to introduce fluid medium from the outside is provided in the buffer section.

5. The circulation fluidized bed-type gasification furnace according to claim 1, wherein a sealed portion that is configured to prevent a reverse flow of gas from the buffer section to the flow rate adjuster is provided in at least a connecting portion between the buffer section and the flow rate adjuster.

6. The circulation fluidized bed-type gasification furnace according to claim 5, wherein the sealed portion is further provided between the flow rate adjuster and the gasification furnace, between the buffer section and the combustion furnace, and between the gasification furnace and the combustion furnace.

7. The circulation fluidized bed-type gasification furnace according to claim 1, wherein the flow rate adjuster is further configured to adjust an amount of the fluid medium that is output from the buffer section to the combustion furnace.

* * * * *